US011415367B2

(12) United States Patent
Poolman et al.

(10) Patent No.: US 11,415,367 B2
(45) Date of Patent: Aug. 16, 2022

(54) MECHANICAL SUBCOOLER WITH BATTERY SUPPLEMENT

(71) Applicant: CARRIER CORPORATION, Palm Beach Gardens, FL (US)

(72) Inventors: Ciara Poolman, Syracuse, NY (US); Robert A. Chopko, Baldwinsville, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/309,987

(22) PCT Filed: Jun. 16, 2017

(86) PCT No.: PCT/US2017/037901
§ 371 (c)(1),
(2) Date: Dec. 14, 2018

(87) PCT Pub. No.: WO2017/218909
PCT Pub. Date: Dec. 21, 2017

(65) Prior Publication Data
US 2019/0323766 A1 Oct. 24, 2019

Related U.S. Application Data

(60) Provisional application No. 62/351,729, filed on Jun. 17, 2016.

(51) Int. Cl.
*F25D 29/00* (2006.01)
*B60H 1/00* (2006.01)
(Continued)

(52) U.S. Cl.
CPC ....... *F25D 29/003* (2013.01); *B60H 1/00428* (2013.01); *B60H 1/3232* (2013.01);
(Continued)

(58) Field of Classification Search
CPC .... B60H 1/3232; B60H 1/323; B60H 1/3226; B60H 1/00428; F25B 7/00; F25B 40/02;
(Continued)

(56) References Cited

U.S. PATENT DOCUMENTS

RE23,998 E   5/1955   Kirkpatrick
4,696,168 A  9/1987   Woods et al.
(Continued)

FOREIGN PATENT DOCUMENTS

CN    1934403 A     3/2007
CN    202041035 U   11/2011
(Continued)

OTHER PUBLICATIONS

International Search Report for International Application No. PCT/US2017/037901; Date of Completion: Sep. 14, 2017; dated Sep. 22, 2017; 7 Pages.
(Continued)

*Primary Examiner* — Tavia Sullens
(74) *Attorney, Agent, or Firm* — Cantor Colburn LLP

(57) ABSTRACT

A transport refrigeration system having a refrigeration unit including: a refrigeration circuit (23) configured to circulate a first refrigerant; a mechanical subcooler (23a); and a battery system (190) configured to power the mechanical subcooler. The mechanical subcooler is thermally connected to the refrigeration circuit.

11 Claims, 3 Drawing Sheets

(51) Int. Cl.
    *B60H 1/32*     (2006.01)
    *F25B 7/00*     (2006.01)
    *F25B 40/02*     (2006.01)
    *F25D 11/00*     (2006.01)

(52) U.S. Cl.
    CPC ............... *F25B 7/00* (2013.01); *F25B 40/02* (2013.01); *F25D 11/003* (2013.01); *F25B 2327/001* (2013.01); *F25B 2500/12* (2013.01)

(58) Field of Classification Search
    CPC ............ F25B 2327/001; F25B 2500/12; F25D 11/003; F25D 29/003; B60P 3/20
    See application file for complete search history.

(56) References Cited

U.S. PATENT DOCUMENTS

| | | | |
|---|---|---|---|
| 5,333,678 A * | 8/1994 | Mellum | B60H 1/323 122/26 |
| 5,438,842 A * | 8/1995 | Watkins | B60H 1/3232 454/91 |
| 6,223,546 B1 | 5/2001 | Chopko et al. | |
| 6,688,125 B2 | 2/2004 | Okamoto et al. | |
| 6,705,103 B2 | 3/2004 | Leuthner | |
| 6,708,511 B2 | 3/2004 | Martin | |
| 6,820,434 B1 | 11/2004 | Gutheim et al. | |
| 7,628,027 B2 | 12/2009 | Shapiro | |
| 8,004,242 B1 * | 8/2011 | Purkey | B60R 16/033 320/132 |
| 8,295,950 B1 * | 10/2012 | Wordsworth | B60H 1/00428 700/22 |
| 9,440,525 B1 * | 9/2016 | Baty | B60H 1/00428 |
| 9,960,609 B2 * | 5/2018 | Muralidhar | H02J 7/007 |
| 2005/0210903 A1 * | 9/2005 | Allen | B60H 1/3232 62/244 |
| 2006/0042286 A1 * | 3/2006 | Heberle | B60H 1/323 62/239 |
| 2008/0034773 A1 | 2/2008 | Karapetian | |
| 2013/0000342 A1 * | 1/2013 | Blasko | B60H 1/00428 62/235.1 |
| 2014/0020414 A1 * | 1/2014 | Rusignuolo | B60H 1/3232 62/115 |
| 2014/0137580 A1 * | 5/2014 | Peyaud | F25B 41/04 62/80 |
| 2015/0121923 A1 | 5/2015 | Rusignuolo et al. | |
| 2015/0166262 A1 * | 6/2015 | Farrar | B65D 88/74 62/60 |
| 2015/0321539 A1 | 11/2015 | Mohs et al. | |

FOREIGN PATENT DOCUMENTS

| | | | |
|---|---|---|---|
| CN | 203615641 U | 5/2014 | |
| CN | 203959038 U | 11/2014 | |
| CN | 104919259 A | 9/2015 | |
| EP | 2689944 A2 | 1/2014 | |
| FR | 2960949 A1 | 12/2011 | |
| WO | 2014082069 A1 | 5/2014 | |
| WO | 2015126019 A1 | 8/2015 | |
| WO | 2015174830 A1 | 11/2015 | |
| WO | 2016018692 A1 | 2/2016 | |
| WO | WO-2016018692 A1 * | 2/2016 | ............ F25B 25/005 |

OTHER PUBLICATIONS

Written Opinion for International Application No. PCT/US2017/037901; International Filing Date: Jun. 16, 2017; dated Sep. 22, 2017; 6 Pages.

TEJ35A Electric Transport Refrigeration Unit Using Inverter for Light Trucks; Transportation Refrigeration Dept. Air Conditioning & Refrigeration Division Machinery, Equipment & Infrastructure; Mitsubishi Heavy Industries, Ltd., 3 pgs.

First Chinese Office Action for Application No. 201780042440.5; Office Action dated Jul. 30, 2020; Office Action Received: Sep. 30, 2020; 15 pages.

EP Office action for Application No. 17 733 701.1-1017; Office Action dated Sep. 14, 2021; 4 pages.

* cited by examiner

MECHANICAL SUBCOOLER WITH BATTERY SUPPLEMENT

BACKGROUND OF THE DISCLOSURE

The embodiments herein generally relate to "all electric" transport refrigeration systems and more specifically, a method and apparatus for operating such systems.

Typically, transport refrigeration systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, transport refrigeration systems allow perishable goods to be effectively transported and distributed without damage or other undesirable effects.

Refrigerated trucks and trailers are commonly used to transport perishable goods in a cold chain distribution system. A transport refrigeration system is mounted to the truck or to the trailer in operative association with a cargo space defined within the truck or trailer for maintaining a controlled temperature environment within the cargo space.

Conventionally, transport refrigeration systems used in connection with refrigerated trucks and refrigerated transport containers include a refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated trucks and refrigerated transport containers, the compressor, and typically other components of the refrigeration unit, must be powered during transit by a prime mover. In the case of refrigerated transport containers, the prime mover typically comprises a diesel engine carried on and considered part of the transport refrigeration system. In mechanically driven transport refrigeration systems the compressor is driven by the diesel engine, either through a direct mechanical coupling or a belt drive, and other components, such as the condenser and evaporator fans are belt driven.

An "all electric" transport refrigeration system for a refrigerated transport container application is also commercially available through Carrier Corporation. In the all electric transport refrigeration system, a prime mover, most commonly a diesel engine, carried on and considered part of the transport refrigeration system, drives an AC synchronous generator that generates AC power. The generated AC power is used to power an electric compressor motor for driving the refrigerant compressor of the refrigeration unit and also powering electric AC fan motors for driving the condenser and evaporator motors and electric heaters associated with the evaporator. For example, U.S. Pat. No. 6,223,546 discloses an all electric transport refrigeration system.

The prime mover of transport refrigeration systems is usually extremely loud, especially when increasing the power load required. Thus, an apparatus that could provide added efficiency to the transport refrigeration system, while not increasing the load on the prime mover is desired.

BRIEF DESCRIPTION OF THE DISCLOSURE

According to one embodiment, a transport refrigeration system having a refrigeration unit is provided. The transport refrigeration system including: a refrigeration circuit configured to circulate a first refrigerant; a mechanical subcooler; and a battery system configured to power the mechanical subcooler. The mechanical subcooler is thermally connected to the refrigeration circuit.

In addition to one or more of the features described above, or as an alternative, further embodiments of the transport refrigeration system may include an electric generation device configured to power the refrigeration circuit; and a prime mover configured to drive the electric generation device.

In addition to one or more of the features described above, or as an alternative, further embodiments of the transport refrigeration system may include a first fan configured to operatively pass air over a first refrigerant heat rejection heat exchanger of the refrigeration circuit; and a second fan configured to operatively pass air over a second refrigerant heat absorption heat exchanger of the mechanical subcooler. The battery system is configured to power the first fan and the second fan.

In addition to one or more of the features described above, or as an alternative, further embodiments of the transport refrigeration system may include a controller configured to control the refrigeration circuit, the mechanical subcooler, and the battery system.

In addition to one or more of the features described above, or as an alternative, further embodiments of the transport refrigeration system may include that the battery system is located within the refrigeration unit and releasably connected to the refrigeration unit.

In addition to one or more of the features described above, or as an alternative, further embodiments of the transport refrigeration system may include that the battery system is integrally attached to a refrigerated transport container of the transport refrigeration system.

In addition to one or more of the features described above, or as an alternative, further embodiments of the transport refrigeration system may include that the battery system is integrally attached to a drop deck configured to carry a refrigerated transport container of the transport refrigeration system. The drop deck being releasably connected to the refrigerated transport container.

In addition to one or more of the features described above, or as an alternative, further embodiments of the transport refrigeration system may include that the battery system is integrally attached to a tractor configured to pull a refrigerated transport container of the transport refrigeration system. The tractor being releasably connected to the refrigerated transport container.

In addition to one or more of the features described above, or as an alternative, further embodiments of the transport refrigeration system may include that the battery system is composed of at least one of a lithium ion battery, a nickel-metal hydride battery, an alkaline battery, a nickel-hydrogen battery, and a lead-acid battery.

According to another embodiment, a method of operating a refrigeration unit of a transport refrigeration system is provided. The method includes the steps of: circulating a first refrigerant through a refrigeration circuit; removing heat from the first refrigerant using a mechanical subcooler;

and powering, using a battery system, the mechanical subcooler. The mechanical subcooler is thermally connected to the refrigeration circuit.

In addition to one or more of the features described above, or as an alternative, further embodiments of the method may include powering, using an electric generation device, the refrigeration circuit; and driving, using a prime mover, the electric generation device.

In addition to one or more of the features described above, or as an alternative, further embodiments of the method may include: operatively passing, using a first fan configured, pass air over a first refrigerant heat rejection heat exchanger of the refrigeration circuit; operatively passing, using a second fan, air over a second refrigerant heat absorption heat exchanger of the mechanical subcooler; and powering, using the battery system, the first fan and the second fan.

In addition to one or more of the features described above, or as an alternative, further embodiments of the method may include controlling, using a controller, the refrigeration circuit, the mechanical subcooler, and the battery system.

In addition to one or more of the features described above, or as an alternative, further embodiments of the method may include that the battery system is located within the refrigeration unit and releasably connected to the refrigeration unit.

In addition to one or more of the features described above, or as an alternative, further embodiments of the method may include that the battery system is integrally attached to a refrigerated transport container of the transport refrigeration system.

In addition to one or more of the features described above, or as an alternative, further embodiments of the method may include that the battery system is integrally attached to a drop deck configured to carry a refrigerated transport container of the transport refrigeration system. The drop deck being releasably connected to the refrigerated transport container.

In addition to one or more of the features described above, or as an alternative, further embodiments of the method may include that the battery system is integrally attached to a tractor configured to pull a refrigerated transport container of the transport refrigeration system. The tractor being releasably connected to the refrigerated transport container.

In addition to one or more of the features described above, or as an alternative, further embodiments of the method may include that the battery system is composed of at least one of a lithium ion battery, a nickel-metal hydride battery, an alkaline battery, a nickel-hydrogen battery, and a lead-acid battery.

According to another embodiment a controller for a refrigeration unit of a transport refrigeration system is provided. The controller including: a processor; and a memory comprising computer-executable instructions that, when executed by the processor, cause the processor to perform operations. The operations including: circulating a first refrigerant through a refrigeration circuit; removing heat from the first refrigerant using a mechanical subcooler; and powering, using a battery system, the mechanical subcooler. The mechanical subcooler is thermally connected to the refrigeration circuit.

In addition to one or more of the features described above, or as an alternative, further embodiments of the controller may include that the operations further include: powering, using an electric generation device, the refrigeration circuit; and driving, using a prime mover, the electric generation device.

In addition to one or more of the features described above, or as an alternative, further embodiments of the controller may include that the operations further include: operatively passing, using a first fan configured, pass air over a first refrigerant heat rejection heat exchanger of the refrigeration circuit; operatively passing, using a second fan, air over a second refrigerant heat absorption heat exchanger of the mechanical subcooler; and powering, using the battery system, the first fan and the second fan.

In addition to one or more of the features described above, or as an alternative, further embodiments of the controller may include that the operation further include controlling, using a controller, the refrigeration circuit, the mechanical subcooler, and the battery system.

In addition to one or more of the features described above, or as an alternative, further embodiments of the controller may include that the battery system is located within the refrigeration unit and releasably connected to the refrigeration unit.

In addition to one or more of the features described above, or as an alternative, further embodiments of the controller may include that the battery system is integrally attached to a refrigerated transport container of the transport refrigeration system.

In addition to one or more of the features described above, or as an alternative, further embodiments of the controller may include that the battery system is integrally attached to a drop deck configured to carry a refrigerated transport container of the transport refrigeration system. The drop deck being releasably connected to the refrigerated transport container.

In addition to one or more of the features described above, or as an alternative, further embodiments of the controller may include the battery system is integrally attached to a tractor configured to pull a refrigerated transport container of the transport refrigeration system. The tractor being releasably connected to the refrigerated transport container.

In addition to one or more of the features described above, or as an alternative, further embodiments of the controller may include that the battery system is composed of at least one of a lithium ion battery, a nickel-metal hydride battery, an alkaline battery, a nickel-hydrogen battery, and a lead-acid battery.

Technical effects of embodiments of the present disclosure include powering a mechanical subcooler of a refrigeration unit with a battery to increase the cooling capacity of the refrigeration unit while not increasing the load of the prime mover.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION OF THE DISCLOSURE

Figure 1:
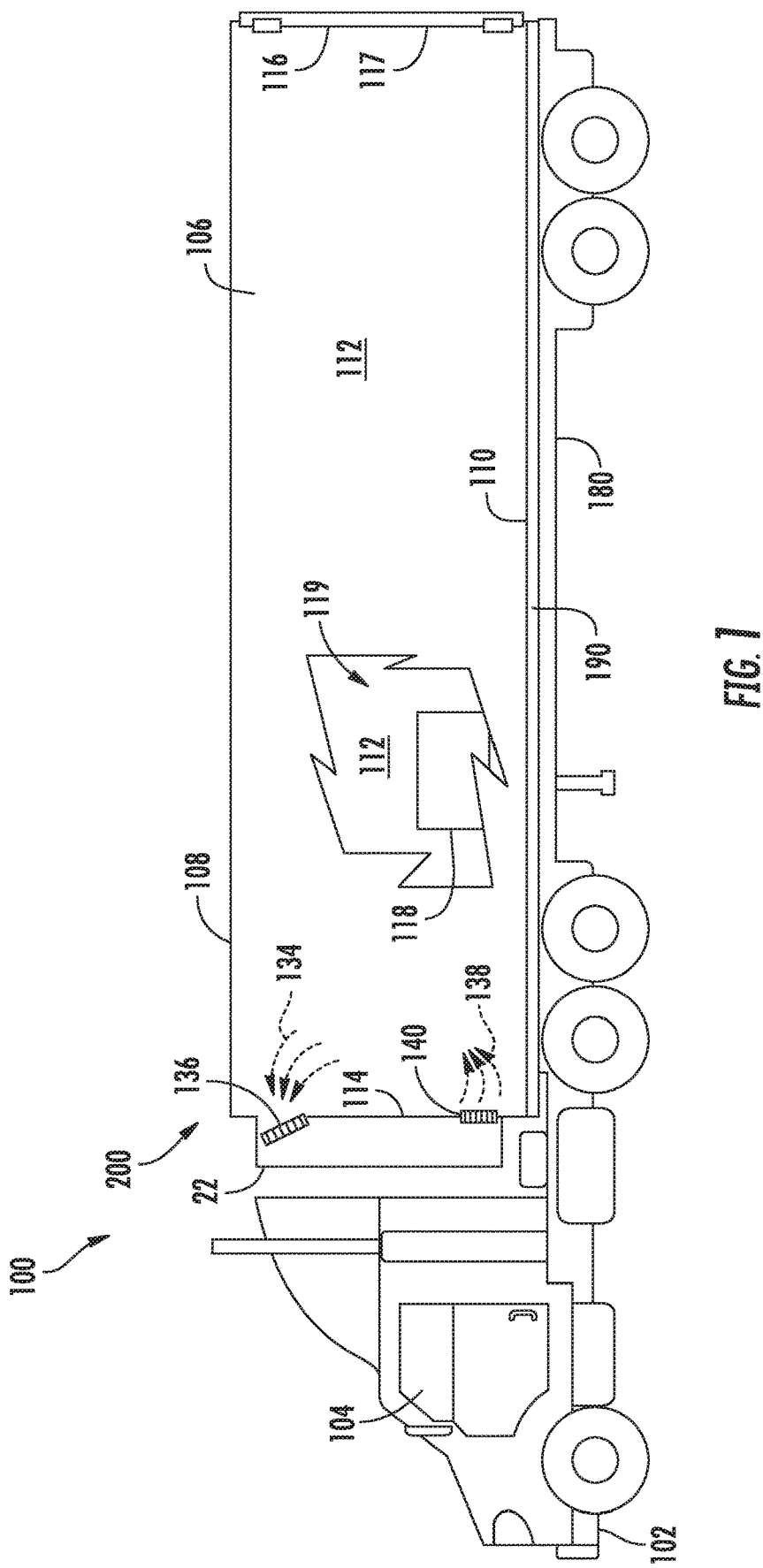
FIG. 1 is a schematic illustration of a transport refrigeration system, according to an embodiment of the present disclosure.
Figure 2:
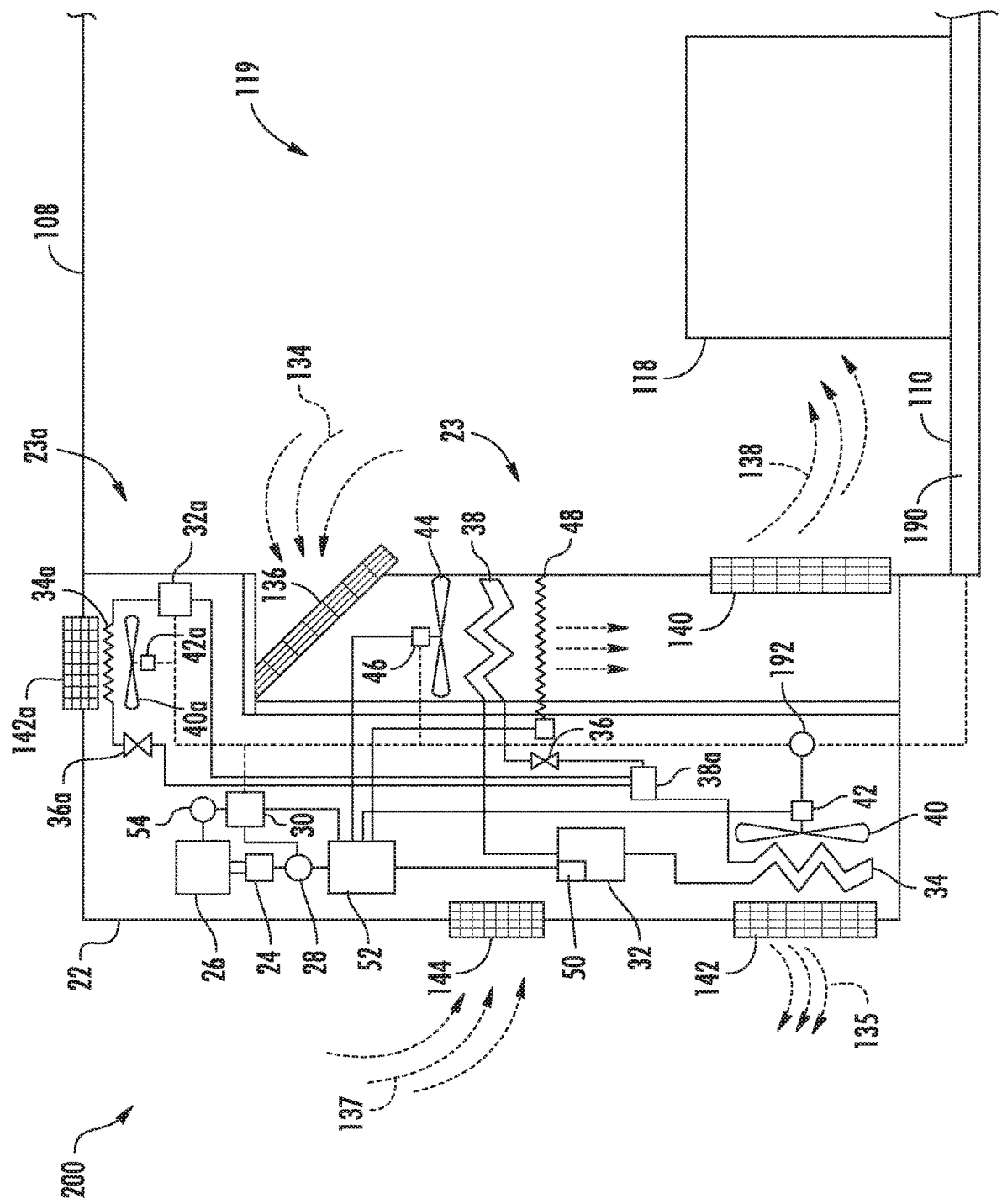
FIG. 2 is an enlarged schematic illustration of the transport refrigeration system of FIG. 1, according to an embodiment of the present disclosure.

Referring now to FIGS. 1-2, various embodiments of the present disclosure are illustrated. FIG. 1 shows a schematic illustration of a transport refrigeration system 200, according to an embodiment of the present disclosure. FIG. 2 shows an enlarged schematic illustration of the transport refrigeration system 200 of FIG. 1, according to an embodiment of the present disclosure. The transport refrigeration system 200 is being illustrated as a trailer system 100 as seen in FIG. 1. It is appreciated by those of skill in the art that embodiments described herein may be applied to any transport refrigeration system such as, for example shipping containers that are shipped by rail, sea, or any other suitable container, without use of a tractor 102. The trailer system 100 includes a tractor 102 and a refrigerated transport container 106. The tractor 102 includes an operator's compartment or cab 104 and an engine (not shown), which acts as the drive system of the trailer system 100. The refrigerated transport container 106 is coupled or releasably connected to the tractor 102. The refrigerated transport container 106 is a refrigerated trailer and includes a top wall 108, a directly opposed bottom wall 110, opposed side walls 112, and a front wall 114, with the front wall 114 being closest to the tractor 102. The refrigerated transport container 106 further includes a door or doors 117 at a rear wall 116, opposite the front wall 114. The walls of the refrigerated transport container 106 define a refrigerated cargo space 119.

Typically, transport refrigeration systems 200 are used to transport and distribute perishable goods and environmentally sensitive goods (herein referred to as perishable goods 118). The perishable goods 118 may include but are not limited to fruits, vegetables, grains, beans, nuts, eggs, dairy, seed, flowers, meat, poultry, fish, ice, blood, pharmaceuticals, or any other suitable cargo requiring refrigerated transport. The transport refrigeration system 200 includes a refrigeration unit 22, an electric generation device 24, a prime mover 26 for driving the electric generation device 24, and a controller 30. The refrigeration unit 22 functions, under the control of the controller 30, to establish and regulate a desired environmental parameters such as, for example temperature, pressure, humidity, carbon dioxide, ethylene, ozone, light exposure, vibration exposure, and other conditions in the interior compartment 119 as known to one of ordinary skill in the art. In an embodiment, the refrigeration unit 22 is a refrigeration system capable of providing a desired temperature and humidity range.

The refrigeration unit 22 includes a first refrigerant compression device 32, a first refrigerant heat rejection heat exchanger 34, a first expansion device 36, and a first refrigerant heat absorption heat exchanger 38 connected in refrigerant flow communication in a closed loop refrigeration circuit 23 and arranged in a conventional refrigeration cycle. The refrigeration unit 22 also includes one or more fans 40 associated with the first refrigerant heat rejection heat exchanger 34 and driven by fan motor(s) 42 and one or more fans 44 associated with the first refrigerant heat absorption heat exchanger 38 and driven by fan motor(s) 46. The refrigeration unit 22 may also include a heater 48 associated with the first refrigerant heat absorption heat exchanger 38. In an embodiment, the heater 48 may be an electric resistance heater. It is to be understood that other components (not shown) may be incorporated into the refrigeration circuit 23 as desired, including for example, but not limited to, a suction modulation valve, a receiver, a filter/dryer, an economizer circuit.

The first refrigerant heat rejection heat exchanger 34 may, for example, comprise one or more refrigerant conveying coiled tubes or one or more tube banks formed of a plurality of refrigerant conveying tubes across flow path to the heat outlet 142. The fan(s) 40 are operative to pass air, typically ambient air, across the tubes of the first refrigerant heat rejection heat exchanger 34 to cool refrigerant vapor passing through the tubes. The first refrigerant heat rejection heat exchanger 34 may operate either as a refrigerant condenser, such as if the refrigeration unit 22 is operating in a subcritical refrigerant cycle or as a refrigerant gas cooler, such as if the refrigeration unit 22 is operating in a transcritical cycle.

The first refrigerant heat absorption heat exchanger 38 may, for example, also comprise one or more refrigerant conveying coiled tubes or one or more tube banks formed of a plurality of refrigerant conveying tubes extending across flow path from a return air inlet 136. The fan(s) 44 are operative to pass air drawn from the refrigerated cargo space 119 across the tubes of the first refrigerant heat absorption heat exchanger 38 to heat and evaporate refrigerant liquid passing through the tubes and cool the air. The air cooled in traversing the first refrigerant heat absorption heat exchanger 38 is supplied back to the refrigerated cargo space 119 through a refrigeration unit outlet 140. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

The first refrigerant compression device 32 may comprise a single-stage or multiple-stage compressor such as, for example, a reciprocating compressor or a scroll compressor. The compression device 32 has a compression mechanism (not shown) driven by an electric motor 50. In an embodiment, the motor 50 may be disposed internally within the compressor with a drive shaft interconnected with a shaft of the compression mechanism, all sealed within a common housing of the compression device 32.

The transport refrigeration system 200 also includes a controller 30 configured for controlling operation of the transport refrigeration system 200 including, but not limited to, operation of various components of the refrigerant unit 22 to provide and maintain a desired thermal environment within the refrigerated cargo space 119. The controller 30 may also be able to selectively operate the prime mover 26, typically through an electronic engine controller 54 operatively associated with the prime mover 26. The controller 30 may also be able to selectively operate the battery system 190. The controller 30 may be an electronic controller including a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

The refrigeration unit 22 has a plurality of power demand loads, including, but not limited to, the compression device drive motor 50, the drive motor 42 for the fan 40 associated with the first refrigerant heat rejection heat exchanger 34, and the drive motor 46 for the fan 44 associated with the first refrigerant heat absorption heat exchanger 38. In the depicted embodiment, the heater 48 also constitutes a power demand load. The electric resistance heater 48 may be selectively operated by the controller 30 whenever a control temperature within the temperature controlled cargo box drops below a preset lower temperature limit, which may occur in a cold ambient environment. In such an event the controller 30 would activate the heater 48 to heat air circulated over the heater 48 by the fan(s) 44 associated with the first refrigerant heat absorption heat exchanger 38. The heater 48 may also be used to de-ice the return air intake 136.

The prime mover 26, which comprises an on-board fossil-fuel engine, most commonly a diesel engine, drives the electric generation device 24 that generates electrical power. The drive shaft of the engine drives the shaft of the electric generation device 24. In an electrically powered embodiment of the refrigeration unit 20, the electric generation device 24 may comprise a single on-board, engine driven AC generator configured to generate alternating current (AC) power including at least one AC voltage at one or more frequencies. In an embodiment, the electric generation device 24 may, for example, be a permanent magnet AC generator or a synchronous AC generator. In another embodiment, the electric generation device 24 may comprise a single on-board, engine driven DC generator configured to generate direct current (DC) power at at least one voltage. Some electric generation devices may have internal voltage regulators while other electric generation devices do not. As each of the fan motors 42, 46 and the compression device drive motor 50 may be an AC motor or a DC motor, it is to be understood that various power converters 52, such as AC to DC rectifiers, DC to AC inverters, AC to AC voltage/frequency converters, and DC to DC voltage converters, may be employed in connection with the electric generation device 24 as appropriate. The transport refrigeration system 200 may include a voltage sensor 28 to sense the voltage of the electric generation device 24.

Airflow is circulated into and through the refrigerate cargo space 119 of the refrigerated transport container 106 by means of the refrigeration unit 22. A return airflow 134 flows into the refrigeration unit 22 from the refrigerated cargo space 119 through the refrigeration unit return air intake 136, and across the first refrigerant heat absorption heat exchanger 38 via the fan 44, thus conditioning the return airflow 134 to a selected or predetermined temperature. The conditioned return airflow 134, now referred to as supply airflow 138, is supplied into the refrigerated cargo space 119 of the refrigerated transport container 106 through the refrigeration unit outlet 140, which in some embodiments is located near the bottom wall 110 of the container system 106. Heat 135 is removed from the first refrigerant heat rejection heat exchanger 34 through the heat outlet 142.

The refrigeration unit 22 may contain an external air inlet 144, as shown in FIG. 2, to aid in the removal of heat 135 from the first refrigerant heat rejection heat exchanger 34 by pulling in external air 137. The supply airflow 138 cools the perishable goods 118 in the refrigerated cargo space 119 of the refrigerated transport container 106. It is to be appreciated that the refrigeration unit 22 can further be operated in reverse to warm the container system 106 when, for example, the outside temperature is very low. In the illustrated embodiment, the return air intake 136, the refrigeration unit outlet 140, the heat outlet 142, and the external air inlet 144 are configured as grilles to help prevent foreign objects from entering the refrigeration unit 22.

In the illustrated embodiment, the transport refrigeration system 200 may also include a mechanical subcooler 23a, which is thermally connected to the refrigeration circuit 23 through a second refrigerant heat absorption heat exchanger 38a. The mechanical subcooler 23a comprises a second refrigerant compression device 32a fluidly connected to the second refrigerant heat absorption heat exchanger 38a; a second refrigerant heat rejection heat exchanger 34a fluidly connected to the second refrigerant compression device 32a; and a second expansion valve 36a fluidly connecting the second refrigerant heat rejection heat exchanger 34a to the second refrigerant heat absorption heat exchanger 38a. The components of the mechanical subcooler 23a operate in a second closed loop refrigerant flow circuit to circulate a second refrigerant through the mechanical subcooler 23a, similar to the first refrigeration circuit 23. The second refrigerant heat rejection heat exchanger 34a may, for example, comprise one or more refrigerant conveying coiled tubes or one or more tube banks formed of a plurality of refrigerant conveying tubes across flow path to the heat outlet 142a. The fan(s) 40a are operative to pass air, typically ambient air, across the tubes of the second refrigerant heat rejection heat exchanger 34a to cool refrigerant vapor passing through the tubes. The fan is powered by motor 42a. Further, the mechanical subcooler 23a is controlled by the controller 30. Advantageously, a mechanical subcooler may increase the efficiency of a traditional refrigeration unit by increasing the cooling capacity of a refrigerant in a refrigeration circuit.

In the illustrated embodiment, the transport refrigeration system 200 includes a battery system 190, as seen in FIG. 1. The battery system 190 is configured to power the mechanical subcooler 23a and may also provide power to various components of the refrigeration unit 22 including but not limited to the fan motors 42, 46 and subsequently the fans 40, 44. The battery system 190 may comprise at least one of a lithium ion battery, a nickel-metal hydride battery, an alkaline battery, a nickel-hydrogen battery, and a lead-acid battery. The battery system 190 may include a voltage regulator 192 to sense and/or regulate the voltage of the battery system 190. The battery system 190 may be charged by various methods including but not limited to excess energy from the engine of the tractor 102, excess energy from the prime mover 26, solar panels, regenerative braking, or any other power generation method known to one of skill in the art.

In the illustrated embodiment, the battery system 190 is integrally attached to the refrigerated transport container 106 of the transport refrigeration system 200 and located proximate a bottom wall 110 of the refrigerated transport container 106. The battery system 190 may be integrally attached to the refrigerated transport container 106 at various other locations, including but not limited to proximate the top wall 108, proximate the rear wall 116, proximate the front wall 114, or within the refrigerated cargo space 119. In another embodiment, the battery system 190 is integrally attached to a drop deck 180 configured to carry the refrigerated transport container 106 of the transport refrigeration system 200. The drop deck 180 is releasably connected to the refrigerated transport container 106. In another embodiment, the battery system 190 is integrally attached to a tractor 102 configured to pull a refrigerated transport container 106 of the transport refrigeration system 200. The tractor 102 being releasably connected to the refrigerated transport container 106. In yet another embodiment, the battery system 190 may be small enough to fit within the refrigeration unit 22 and may be releasably connected to the refrigeration unit 22 to facilitate removal for charging.

Figure 3:
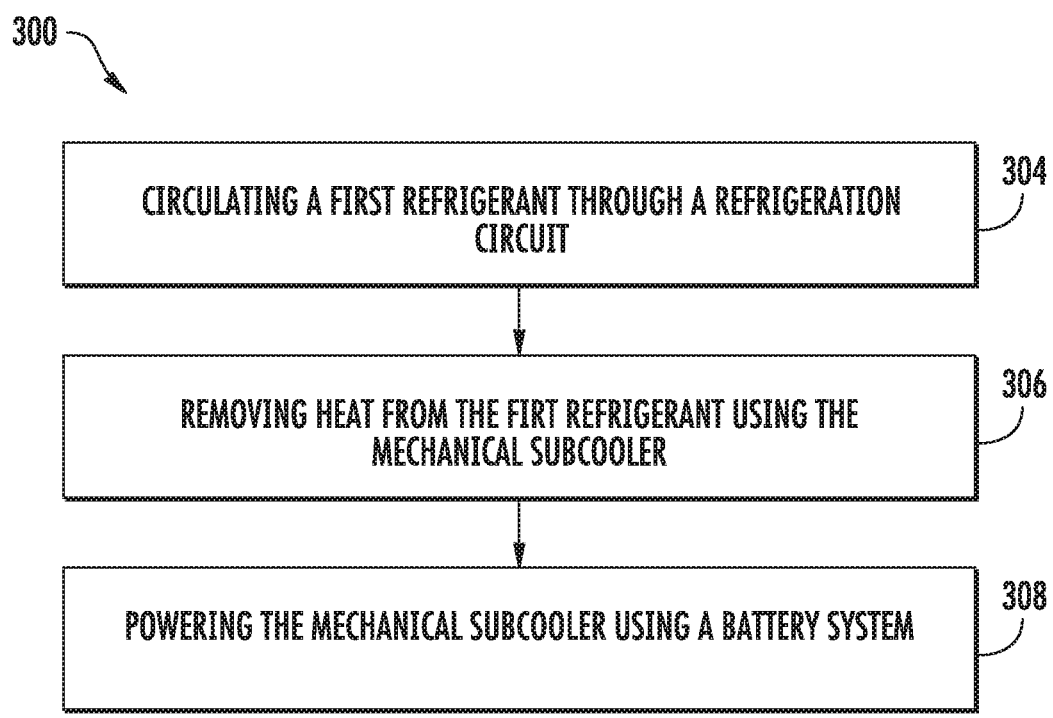
FIG. 3 is a flow diagram illustrating a method of operating a refrigeration unit of the transport refrigeration system of FIG. 1, according to an embodiment of the present disclosure.

Referring now also to FIG. 3, which shows a flow diagram illustrating a method 300 of operating the refrigeration unit 22 of the transport refrigeration system 200 of FIGS. 1 and 2. At block 304, the refrigeration unit 22 circulates a first refrigerant through the refrigeration circuit 23 shown in FIG. 2. The refrigeration circuit 23 comprises the first refrigerant compression device 32; the first refrigerant heat rejection heat exchanger 34 fluidly connected to the first refrigerant compression device 32; the first expansion device 36 fluidly connected to the first refrigeration heat rejection heat exchanger 34; and the first refrigerant heat absorption heat exchanger 38 fluidly connecting the first expansion device 36 to the first refrigerant compression device 32. At block 306, the mechanical subcooler 23a use a second refrigerant to remove heat from the first refrigerant through the second refrigerant heat absorption heat exchanger 38a located between the first refrigerant heat rejection heat exchanger 34 and the first expansion device 36. The mechanical subcooler 23a is thermally connected to the refrigeration circuit 23 at the second refrigerant heat absorption heat exchanger 38a, which allows the second refrigerant to remove heat from the first refrigerant. The refrigeration unit 22 circulates the second refrigerant through the mechanical subcooler 23a shown in FIG. 2. The mechanical subcooler 23a comprises a second refrigerant compression device 32a; a second refrigerant heat rejection heat exchanger 34a fluidly connected to the second refrigerant compression device 32a; a second expansion device 36a fluidly connected to the second refrigeration heat rejection heat exchanger 34a; and a second refrigerant heat absorption heat exchanger 38a fluidly connecting the second expansion device 36a to the second refrigerant compression device 32a. At block 308, the battery system 190 powers the mechanical subcooler 23a. The battery system 190 may also power the fans 40, 44. Advantageously, powering the fans using a battery system will allow the fans to operate even when a prime mover is off and circulate air within a refrigerated cargo space.

While the above description has described the flow process of FIG. 3 in a particular order, it should be appreciated that unless otherwise specifically required in the attached claims that the ordering of the steps may be varied.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A method of operating a refrigeration unit of a transport refrigeration system, the method comprising:
   circulating a first refrigerant in a closed loop through a refrigeration circuit;
   compressing, using a first refrigerant compression device of the refrigeration circuit, the first refrigerant;
   powering, using an electric generation device, the first refrigerant compression device;
   driving, using a prime mover, the electric generation device;
   removing heat from the first refrigerant using a first refrigerant heat rejection heat exchanger of the refrigeration circuit;
   operatively passing, using a first fan, air over the first refrigerant heat rejection heat exchanger;
   absorbing heat to the first refrigerant using a first heat absorption heat exchanger of the refrigeration circuit;
   operatively passing, using a second fan, air over the first refrigerant heat absorption heat exchanger;
   removing heat from the first refrigerant using a second refrigerant heat absorption heat exchanger;
   compressing, using a second refrigerant compression device, a second refrigerant, the second refrigerant is configured to circulate through the second refrigerant heat absorption heat exchanger, the second refrigerant compression device, and a second refrigerant heat rejection heat exchanger in a second closed loop refrigerant flow circuit;
   removing heat from the second refrigerant using the second refrigerant heat rejection heat exchanger;
   operatively passing, using a third fan, air over the second refrigerant heat rejection heat exchanger; and
   powering, using a battery system, the second refrigerant compression device, the first fan, the second fan, and the third fan, wherein the battery system is a single battery system configured to power fans of the refrigeration circuit and the second closed loop refrigerant flow circuit, and wherein the refrigeration circuit and the second closed loop refrigerant flow circuit are simultaneously fluidly separate and thermally connected through heat exchange between the first refrigerant and the second refrigerant in the second refrigerant heat absorption heat exchanger;
   wherein the battery system does not power the first compression device,
   wherein the battery system is configured to only power the first fan, the second fan, the third fan, and the second refrigerant compression device, and
   wherein using the battery system to power the second refrigerant compression device is configured to increase the cooling capacity of the refrigeration unit while not increasing a load of the prime mover.

2. The method of claim 1, further comprising:
   controlling, using a controller, the refrigeration circuit, the first fan, the second fan, the third fan, the second refrigerant compression device, and the battery system.

3. The method of claim 1, wherein:
   the battery system is integrally attached to a refrigerated transport container of the transport refrigeration system.

4. The method of claim 1, wherein:
the battery system is integrally attached to a drop deck configured to carry a refrigerated transport container of the transport refrigeration system, the drop deck being releasably connected to the refrigerated transport container.

5. The method of claim 1, wherein:
the battery system is composed of at least one of a lithium ion battery, a nickel metal hydride battery, an alkaline battery, a nickel-hydrogen battery, and a lead-acid battery.

6. A transport refrigeration system, the transport refrigeration system comprising:
a refrigeration unit comprising:
a refrigeration circuit configured to circulate a first refrigerant in a closed loop, the refrigeration circuit comprising:
a first refrigerant compression device configured to compress the first refrigerant;
an electric generation device configured to power the first refrigerant compression device;
a prime mover configured to drive the electric generation device;
a first refrigerant heat rejection heat exchanger;
a first fan configured to operatively pass air over the first refrigerant heat rejection heat exchanger;
a first heat absorption heat exchanger;
a second fan configured to operatively pass air over the first refrigerant heat absorption heat exchanger;
a second refrigerant heat absorption heat exchanger; and
a mechanical subcooler thermally connected to the refrigeration circuit via the second refrigerant heat absorption heat exchanger, the mechanical subcooler comprising:
a second refrigerant compression device compressing a second refrigerant in a second closed loop refrigerant flow circuit;
a second refrigerant heat rejection heat exchanger in the second closed loop refrigerant flow circuit; and
a third fan configured to operatively pass air over the second refrigerant heat rejection heat exchanger; and a battery system configured to power the second refrigerant compression device, the first fan, the second fan, and the third fan, wherein the battery system is a single battery system configured to power fans of the refrigeration circuit and the second closed loop refrigerant flow circuit, and wherein the refrigeration circuit and the second closed loop refrigerant flow circuit are simultaneously fluidly separate and thermally connected through heat exchange between the first refrigerant and the second refrigerant in the second refrigerant heat absorption heat exchanger,
wherein the battery system does not power the first compression device,
wherein the battery system is configured to only power the first fan, the second fan, the third fan, and the second refrigerant compression device, and
wherein using the battery system to power the second refrigerant compression device of the mechanical subcooler is configured to increase the cooling capacity of the refrigeration unit while not increasing a load of the prime mover.

7. The transport refrigeration system of claim 6, further comprising:
a controller configured to control the refrigeration circuit, the mechanical subcooler, and the battery system.

8. The transport refrigeration system of claim 6, wherein:
the battery system is located within the refrigeration unit and releasably connected to the refrigeration unit.

9. The transport refrigeration system of claim 6, wherein:
the battery system is integrally attached to a refrigerated transport container of the transport refrigeration system.

10. The transport refrigeration system of claim 6, wherein:
the battery system is integrally attached to a drop deck configured to carry a refrigerated transport container of the transport refrigeration system, the drop deck being releasably connected to the refrigerated transport container.

11. The transport refrigeration system of claim 6, wherein:
the battery system is composed of at least one of a lithium ion battery, a nickel metal hydride battery, an alkaline battery, a nickel-hydrogen battery, and a lead-acid battery.

* * * * *